United States Patent
Nobe

(10) Patent No.: US 12,495,345 B2
(45) Date of Patent: Dec. 9, 2025

(54) COMMUNICATION SYSTEM, FIRST USER APPARATUS, SECOND USER APPARATUS, CORE NETWORK NODE, CONTROL METHOD, PROGRAM, AND NON-TRANSITORY RECORDING MEDIUM STORING PROGRAM

(71) Applicant: NEC Corporation, Tokyo (JP)

(72) Inventor: Makoto Nobe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 514 days.

(21) Appl. No.: 18/016,158

(22) PCT Filed: Jul. 26, 2021

(86) PCT No.: PCT/JP2021/027512
§ 371 (c)(1),
(2) Date: Jan. 13, 2023

(87) PCT Pub. No.: WO2022/024982
PCT Pub. Date: Feb. 3, 2022

(65) Prior Publication Data
US 2023/0284111 A1 Sep. 7, 2023

(30) Foreign Application Priority Data
Jul. 31, 2020 (JP) .................. 2020-130844

(51) Int. Cl.
*H04W 36/22* (2009.01)
*H04W 36/00* (2009.01)
*H04W 36/36* (2009.01)

(52) U.S. Cl.
CPC .......... *H04W 36/22* (2013.01); *H04W 36/13* (2023.05); *H04W 36/362* (2023.05)

(58) Field of Classification Search
CPC ..... H04W 36/14; H04W 36/13; H04W 36/22; H04W 36/36; H04W 36/362
See application file for complete search history.

(56) References Cited

U.S. PATENT DOCUMENTS

| | | | |
|---|---|---|---|
| 2017/0086118 A1* | 3/2017 | Vrzic | H04W 36/26 |
| 2021/0176175 A1 | 6/2021 | Onishi | |
| 2023/0217363 A1* | 7/2023 | Wang | H04L 41/0894 370/328 |

FOREIGN PATENT DOCUMENTS

| | | |
|---|---|---|
| JP | 2016-184854 A | 10/2016 |
| JP | 2018-157506 A | 10/2018 |

(Continued)

OTHER PUBLICATIONS

English translation of Written opinion for PCT Application No. PCT/JP2021/027512, mailed on Oct. 26, 2021.

(Continued)

*Primary Examiner* — Ji-Hae Yea
(74) *Attorney, Agent, or Firm* — Sughrue Mion, PLLC

(57) ABSTRACT

Provided is a communication system configuring a plurality of network slices, the communication system including a plurality of user apparatuses including first and second user apparatuses belonging to a same slice change group, and one or more core network nodes configured to control switching of a network slice to which the user apparatus belongs, the first user apparatus being configured to, in response to detection of a trigger to transition from a first network slice to a second network slice, transmit to the core network node a switching request message requesting switching to the second network slice, and transmit to the second user apparatus change information indicating that transition to the second network slice is to be performed.

20 Claims, 13 Drawing Sheets

(56) References Cited

FOREIGN PATENT DOCUMENTS

| JP | 2020-057859 A | 4/2020 |
|---|---|---|
| JP | 2021-158605 A | 10/2021 |
| WO | 2019/131404 A1 | 7/2019 |
| WO | 2022/001653 A1 | 1/2022 |

OTHER PUBLICATIONS

International Search Report for PCT Application No. PCT/JP2021/027512, mailed on Oct. 26, 2021.
Written opinion for PCT Application No. PCT/JP2021/027512, mailed on Oct. 26, 2021.
JP Official Communication for JP Application No. 2022-540285, mailed on Jan. 9, 2024 with English Translation.

* cited by examiner

| USER APPARATUS | SLICE CHANGE LIST |
| --- | --- |
| 100a | (100a), 100b, 100c |
| 100b | (100b), 100a |
| 100c | (100c), 100a, 100d, 100e |
| 100d | (100d), 100c |
| 100e | (100e), 100c, 100f, 100g |
| 100f | (100f), 100e, 100g |
| 100g | (100g), 100e, 100h |

Fig. 10

COMMUNICATION SYSTEM, FIRST USER APPARATUS, SECOND USER APPARATUS, CORE NETWORK NODE, CONTROL METHOD, PROGRAM, AND NON-TRANSITORY RECORDING MEDIUM STORING PROGRAM

This application is a National Stage Entry of PCT/JP2021/027512 filed on Jul. 26, 2021, which claims priority from Japanese Patent Application 2020-130844 filed on Jul. 31, 2020, the contents of all of which are incorporated herein by reference, in their entirety.

TECHNICAL FIELD

The present invention relates to a communication system, a first user apparatus, a second user apparatus, a core network node, a control method, a program, and a non-transitory recording medium storing a program.

BACKGROUND ART

Technical standards of the 3rd Generation Partnership Project (3GPP) define Network Slicing. Network Slicing is a technique in which one network physical facility is logically (virtually) divided into logical facilities, and the divided logical facilities (virtual resources) are combined to configure a logical communication network called a network slice (or, simply referred to as "slice"). In the technical standards, slice changing in the 5th Generation Core Network (5GC) is performed according to a slice change notification based on a trigger initiated by a core network.

On the other hand, there has been proposed a technique for dynamically changing a slice to which a service is assigned, per user apparatus according to the situation of each user apparatus (for example, PLT 1). The above-mentioned technique enables slice change based on a trigger initiated by the user apparatus.

CITATION LIST

Patent Literature

[PTL 1] JP 2018-157506 A

SUMMARY

Technical Problem

The technology disclosed in PLT 1 is a technique for controlling allocation of a network slice to a single user apparatus when an abnormality occurs, and is not a technique for controlling allocation of a network slice to a plurality of user apparatuses. In a configuration in which a plurality of user apparatuses provide various functions in a coordinated manner, it is desired that allocation of a network slice is cooperatively controlled among the plurality of user apparatuses.

In the light of the circumstances described above, the present invention has an example object to provide a system, a first user apparatus, a second user apparatus, a core network node, a control method, a program, and a non-transitory recording medium storing a program that can control allocation of a network slice in a coordinated manner among a plurality of user apparatuses.

Solution to Problem

A communication system according to an example aspect of the present invention is a communication system configuring a plurality of network slices. The communication system includes a plurality of user apparatuses including first and second user apparatuses belonging to a same slice change group, and one or more core network nodes configured to control switching of a network slice to which the user apparatus belongs, in which the first user apparatus includes a communication processing unit configured to, in response to detection of a trigger to transition from a first network slice to a second network slice, transmit to the core network node a switching request message requesting switching to the second network slice, and transmit to the second user apparatus change information indicating that transition to the second network slice is to be performed.

A first user apparatus according to an example aspect of the present invention is a first user apparatus in a communication system configuring a plurality of network slices, and belongs to a same slice change group as a second user apparatus. The first user apparatus includes a communication processing unit configured to, in response to detection of a trigger to transition from a first network slice to a second network slice, transmit to a core network node a switching request message requesting switching to the second network slice, and transmit to the second user apparatus change information indicating that transition to the second network slice is to be performed.

A second user apparatus according to an example aspect of the present invention is a second user apparatus in a communication system configuring a plurality of network slices, and belongs to a same slice change group as a first user apparatus. The second user apparatus includes a communication processing unit configured to receive from the first user apparatus change information indicating that transition from a first network slice to a second network slice is to be performed.

A core network node according to an example aspect of the present invention is a core network node in a communication system configuring a plurality of network slices including first and second network slices. The core network node includes a communication processing unit configured to receive a switching request message that is transmitted from a first user apparatus belonging to a slice change group including a plurality of user apparatuses, and that is for requesting switching from the first network slice to the second network slice, and a switching request message that is transmitted from a second user apparatus belonging to the slice change group, and that is for requesting switching from the first network slice to the second network slice.

A control method according to an example aspect of the present invention is a control method in a communication system configuring a plurality of network slices, the control method including, in a case in which a trigger to transition from a first network slice to a second network slice is detected in a first user apparatus included in a plurality of user apparatuses belonging to a same slice change group, transmitting, from the first user apparatus to a core network node, a switching request message requesting switching to the second network slice, and transmitting, from the first user apparatus to a second user apparatus included in the slice change group, change information indicating that transition to the second network slice is to be performed.

A program according to an example aspect of the present invention causes a computer to function as a first user apparatus including a communication processing unit configured to, in response to detection of a trigger to transition from a first network slice to a second network slice, transmit to a core network node a switching request message requesting switching to the second network slice, and transmit to a second user apparatus change information indicating that transition to the second network slice is to be performed.

A non-transitory recording medium having stored therein a program according to an example aspect of the present invention causes a computer to function as a first user apparatus including a communication processing unit configured to, in response to detection of a trigger to transition from a first network slice to a second network slice, transmit to a core network node a switching request message requesting switching to the second network slice, and transmit to a second user apparatus change information indicating that transition to the second network slice is to be performed.

Advantageous Effects of Invention

According to the present invention, the allocation of the network slice can be controlled in a coordinated manner among the plurality of user apparatuses. Note that, according to the present invention, instead of or together with the above effects, other effects may be exerted.

BRIEF DESCRIPTION OF THE DRAWINGS

FIG. 10 is a diagram illustrating an example of the slice change list L in the operation example according to the first example embodiment of the present invention.

DESCRIPTION OF THE EXAMPLE EMBODIMENTS

Figure 1:
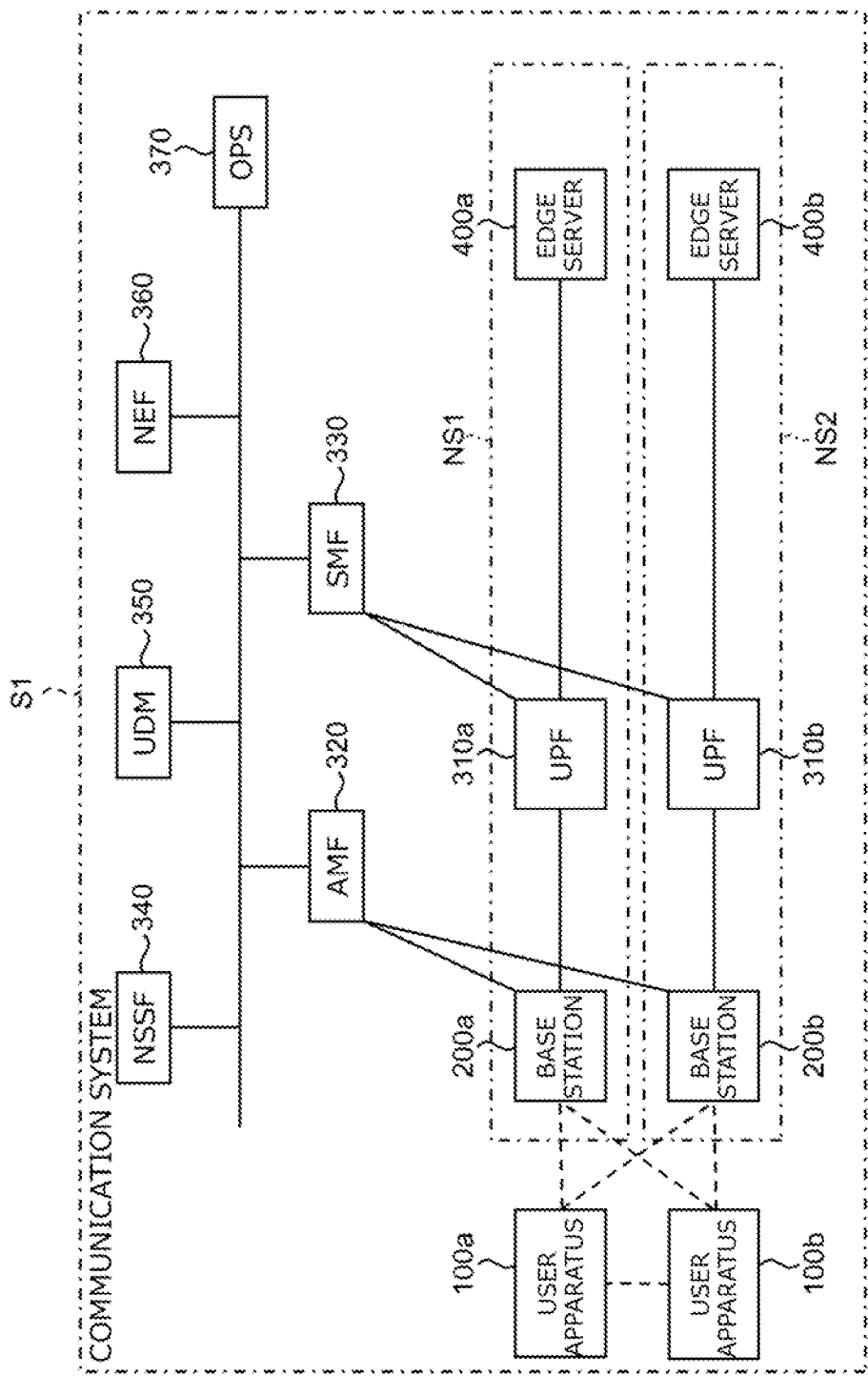
FIG. 1 is an explanatory diagram illustrating an example of a schematic configuration of a communication system S1 according to a first example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely examples of configurations for enabling implementation of the present invention. Each example embodiment described below can be modified or changed as appropriate according to configurations and various conditions of an apparatus to which the present invention is applied. Not necessarily all of the combinations of elements included in each example embodiment described below are essential for implementation of the present invention, and a part of the elements can be omitted as appropriate. Thus, the scope of the present invention is not limited to the configurations described in each example embodiment described below. Configurations obtained by combining a plurality of configurations described in the example embodiments can also be adopted as far as there is no inconsistency.

The description according to the present invention is provided in the following order.
1. Overview of Example Embodiment of Present Invention
2. First Example Embodiment
   2.1. Configuration of Communication System S1
   2.2. Configuration of User Apparatus 100
   2.3. Configuration of Base Station 200
   2.4. General Configuration of Core Network Node 300
   2.5. Configuration of Edge Server 400
   2.6. Operation Examples
   2.7. Example Alterations
3. Second Example Embodiment
   3.1. Configuration of Communication System S1x
   3.2. Configuration and Operation Example of First User Apparatus 100x
   3.3. Configuration and Operation Example of Second User Apparatus 100y
4. Other Example Embodiments 1. Overview of Example Embodiment of Present Invention First, an overview of the example embodiment of the present invention will be described.
(1) Technical Issues The technical standards of the 3rd Generation Partnership Project (3GPP) define Network Slicing. Network Slicing is a technique in which one network physical facility is logically (virtually) divided into logical facilities, and the divided logical facilities (virtual resources) are combined to configure a logical communication network called a network slice (or, simply referred to as "slice"). In the technical standards, slice changing in the 5th Generation Core Network (5GC) is performed according to a slice change notification based on a trigger initiated by a core network.

On the other hand, there has been proposed a technique for dynamically changing a slice to which a service is assigned, per user apparatus according to a situation of each user apparatus. The above-mentioned technique enables slice change based on a trigger initiated by the user apparatus.

The above-mentioned technique is a technique for controlling allocation of a network slice to a single user apparatus when an abnormality occurs, and is not a technique for controlling allocation of a network slice to a plurality of user apparatuses. In a configuration in which a plurality of user apparatuses provide various functions in a coordinated manner, it is desired that allocation of a network slice is cooperatively controlled among the plurality of user apparatuses.

In the light of the circumstances described above, the present example embodiment has an example object to control allocation of a network slice in a coordinated manner among a plurality of user apparatuses.

(2) Technical Features

In an example embodiment according to the present invention, a communication system configuring a plurality of network slices includes a plurality of user apparatuses including first and second user apparatuses belonging to a same slice change group, and one or more core network nodes configured to control switching of a network slice to which the user apparatus belongs. The first user apparatus includes a communication processing unit configured to, in response to detection of a trigger to transition from a first network slice to a second network slice, transmit to the core network node a switching request message requesting switching to the second network slice, and transmit to the second user apparatus change information indicating that transition to the second network slice is to be performed.

According to the example embodiment according to the present invention, in the communication system configuring the plurality of network slices, the first user apparatus belongs to the same slice change group as the second user apparatus. The first user apparatus includes the communication processing unit configured to, in response to the detection of the trigger to transition from the first network slice to the second network slice, transmit to the core network node the switching request message requesting switching to the second network slice, and transmit to the second user apparatus change information indicating that transition to the second network slice is to be performed. The second user apparatus includes a communication processing unit configured to receive the change information from the first user apparatus.

According to the configuration described above, the allocation of the network slice can be controlled in a coordinated manner among the plurality of user apparatuses.

Note that, according to the present example embodiments, instead of or together with the above effects, other effects may be exerted. Note that the technical features described above are a specific example of the example embodiments according to the present invention, and as a matter of course, the example embodiments according to the present invention are not limited to the technical features described above.

2. First Example Embodiment

Next, with reference to FIG. 1 to FIG. 10, a first example embodiment of the present invention will be described.

2.1. Configuration of Communication System S1

FIG. 1 is an explanatory diagram illustrating an example of a schematic configuration of a communication system S1 according to the present example embodiment. As illustrated in FIG. 1, the communication system S1 according to the present example embodiment includes user apparatuses 100 (100*a* and 100*b*), base stations 200 (200*a* and 200*b*), User Plane Functions (UPFs) 310 (310*a* and 310*b*), an Access and Mobility Management Function (AMF) 320, a Session Management Function (SMF) 330, a Network Slice Selection Function (NSSF) 340, an Unified Data Management (UDM) 350, a Network Exposure Function (NEF) 360, an Operation System (OPS) 370, and Edge Servers 400 (400*a* and 400*b*). The communication system S1 may include other elements such as a Policy Control Function (PCF) and an Authentication Server Function (AUSF).

For example, the communication system S1 conforms to Technical Specifications (TSs) of the 3GPP. More specifically, the communication system S1 may be a fifth-generation mobile communication system conforming to technical specifications of the fifth-generation (5G). As a matter of course, the configuration of the communication system S1 is not limited to this example.

The communication system S1 physically has one or more central sites and a plurality of edge sites. The AMF 320, the SMF 330, the NSSF 340, the UDM 350, the NEF 360 and the OPS 370 are centrally located at the one or more central sites. On the other hand, the user apparatuses 100, the base stations 200, the UPFs 310, and the edge servers 400 are located at the edge sites. The UPFs 310, the AMF 320, the SMF 330, the NSSF 340, the UDM 350, the NEF 360, and the OPS 370 are core network nodes 300 that constitute a Core Network (CN). In the core network, for example, the AMF 320, the SMF 330, the NSSF 340, the UDM 350, the NEF 360, and the OPS 370 constitute the control plane (C-plane), and the UPFs 310 constitute the user plane (U-plane). The core network is, for example, partially or wholly configured using Network Function Virtualization (NFV) technology.

The communication system S1 according to the present example embodiment configures a plurality of network slices NSs. Each network slice NS is a virtual (logical) network configured by virtually (logically) separating the base stations 200 and the UPFs 310, and transmission paths between them. The network slices NSs can have different network characteristics from each other. For example, a first network slice NS1 according to the present example embodiment is a low-band slice, and a second network slice NS2 is a high-band slice.

That is, a communication band for the second network slice NS2 is higher than a communication band for the first network slice NS1. High-priority data is transmitted on the high-band second network slice NS2 to enable high-speed and reliable data transmission.

2.2. Configuration of User Apparatus 100

The user equipment 100 is a node that performs radio communication with the other user apparatus 100 and the base stations 200. The user apparatus 100 may be, for example, an IoT device such as a surveillance camera or robot, a mobile phone terminal such as a smartphone, or a communication module mounted on an autonomous vehicle. That is, the user apparatus 100 may be a node for enhanced Mobile Broadband (eMBB), Ultra-Reliable and Low Latency Communications (URLLC), massive Machine Type Communications (mMTC), or inter-vehicle communication (Vehicle to X, V2X).

Figure 2:
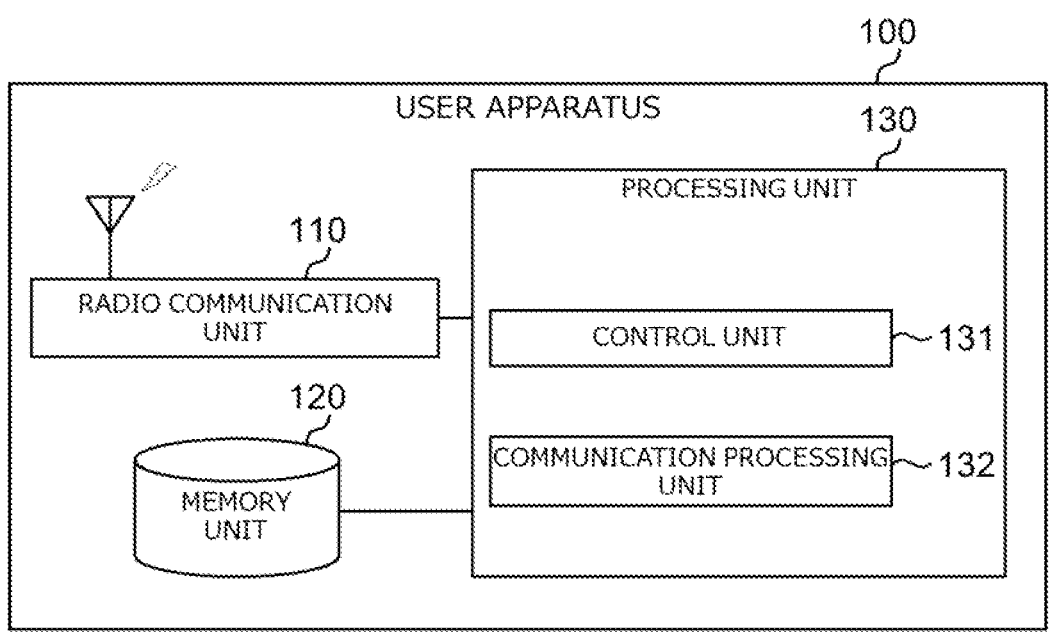
FIG. 2 is a block diagram illustrating an example of a schematic configuration of a user apparatus 100 according to the first example embodiment of the present invention.

FIG. 2 is a block diagram illustrating an example of a schematic configuration of the user apparatus 100 according to the present example embodiment. As illustrated in FIG. 2, the user apparatus 100 includes a radio communication unit 110, a memory unit 120, and a processing unit 130.

The radio communication unit 110 is an element that performs radio communication with the other user apparatus 100 and the base stations 200. The radio communication unit 110 transmits radio signals to the other user apparatus 100 and the base stations 200, and receives radio signals from the other user apparatus 100 and the base stations 200. The radio communication unit 110 can be implemented by, for example, an antenna and a Radio Frequency (RF) circuit.

The memory unit 120 is an element that temporarily or permanently stores programs (instructions) and pieces of data used to execute various types of processing in the user apparatus 100. The programs include one or more instructions for operation of the user apparatus 100. The memory unit 120 may be implemented by, for example, a volatile memory, a nonvolatile memory, or a storage medium such as a magnetic disk, or a combination of two or more of these. The memory unit 120 may be integrally configured with one or more processors constituting the processing unit 130.

The processing unit 130 is an element that provides various functions of the user apparatus 100, and includes a control unit 131 and a communication processing unit 132 as functional blocks. In outline, the control unit 131 controls processing of the user apparatus 100, and the communication processing unit 132 performs communication processing with other nodes such as the base stations 200. The processing unit 130 may further include components other than the above functional blocks. That is, the processing unit 130 can perform operations other than those by the above functional blocks.

The processing unit 130 may be implemented by, for example, one or more processors such as a baseband processor. The processing unit 130 may perform the processing of the present example embodiment described later by deploying the programs stored in the memory unit 120 to the memory unit 120 itself and/or a system memory (not shown) and executing the programs. Each of the functional blocks (the control unit 131 and the communication processing unit 132) may be implemented by one or more processors other than the processing unit 130. The processing unit 130 may be implemented in a System on Chip (SoC).

2.3. Configuration of Base Station 200

The base station 200 is a node that performs radio communication with the user apparatuses 100, that is, a node of a Radio Access Network (RAN). The base station 200 may be, for example, an evolved Node B (eNB) or a generation Node B (gNB) in 5G.

The base station 200 may include a plurality of units (or a plurality of nodes). The plurality of units (or the plurality of nodes) may include a first unit (or first node) that performs processing for a higher protocol layer and a second unit (or second node) that performs processing for a lower protocol layer. As an example, the first unit may be referred to as a Center/Central Unit (CU), and the second unit may be referred to as a Distributed Unit (DU) or an Access Unit (AU). In another example, the first unit may be referred to as a Digital Unit (DU), and the second unit may be referred to as a Radio Unit (RU) or a Remote Unit (RU). The digital unit (DU) may be a Base Band Unit (BBU), and the RU may be a Remote Radio Head (RRH) or a Remote Radio Unit (RRU). As a matter of course, the designations of the first unit (or first node) and the second unit (or second node) are not limited to the above examples, respectively. Alternatively, the base station 200 may be a single unit (or single node). In this configuration, the base station 200 may be one of the plurality of units (for example, one of the first unit and the second unit) or may be connected to another unit (for example, the other of the first unit and the second unit) among the plurality of units.

Figure 3:
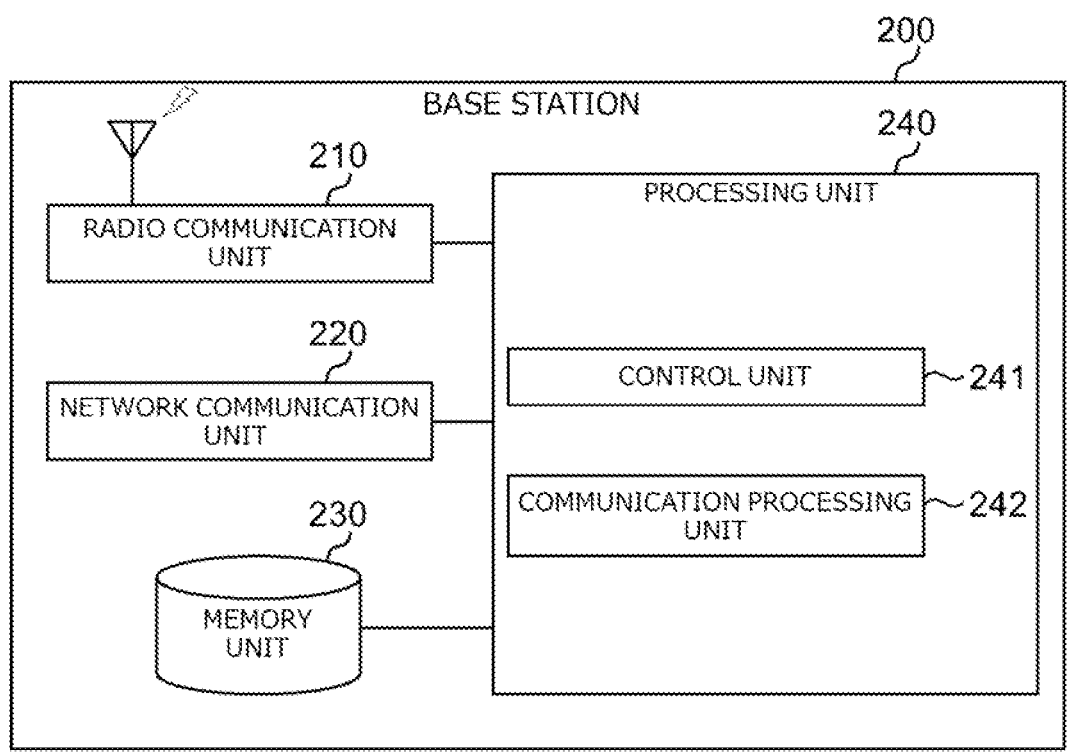
FIG. 3 is a block diagram illustrating an example of a schematic configuration of a base station 200 according to the first example embodiment of the present invention.

FIG. 3 is a block diagram illustrating an example of a schematic configuration of the base station 200 according to the present example embodiment. As illustrated in FIG. 3, the base station 200 includes a radio communication unit 210, a network communication unit 220, a memory unit 230, and a processing unit 240.

The radio communication unit 210 is an element that performs radio communication with the user apparatuses 100. The radio communication unit 210 transmits radio signals to the user apparatuses 100 and receives radio signals from the user apparatuses 100. The radio communication unit 210 can be implemented by, for example, an antenna and a Radio Frequency (RF) circuit.

The network communication unit 220 is an element that communicates with the core network nodes 300 (i.e., core network) including the UPFs 310, the AMF 320 and the like. The network communication unit 220 transmits signals to the core network nodes 300 and receives signals from the core network nodes 300. The network communication unit 220 can be implemented by, for example, a network adapter and/or a network interface card.

The memory unit 230 is an element that temporarily or permanently stores programs (instructions) and pieces of data used to execute various types of processing in the base station 200. The programs include one or more instructions for operation of the base station 200. The memory unit 230 may be implemented by, for example, a volatile memory, a nonvolatile memory, or a storage medium such as a magnetic disk, or a combination of two or more of these. The memory unit 230 may be integrally configured with one or more processors constituting the processing unit 240.

The processing unit 240 is an element that provides various functions of the base station 200, and includes a control unit 241 and a communication processing unit 242 as functional blocks. In outline, the control unit 241 controls processing of the base station 200, and the communication processing unit 242 performs communication processing with other nodes such as the user apparatuses 100 and the core network nodes 300. The processing unit 240 may further include components other than the above functional blocks. That is, the processing unit 240 can perform operations other than those by the above functional blocks.

The processing unit 240 may be implemented by, for example, one or more processors such as a baseband processor. The processing unit 240 may perform the processing of the present example embodiment described later by deploying the programs stored in the memory unit 230 to the memory unit 230 itself and/or a system memory (not shown) and executing the programs. Each of the functional blocks (the control unit 241 and the communication processing unit 242) may be implemented by one or more processors other than the processing unit 240.

The base station 200 may be virtualized. That is, the base station 200 may be implemented as a virtual machine. In the above configuration, the base station 200 (virtual machine) may operate as a virtual machine on a physical machine (hardware) including a processor, memory, etc., and a hypervisor.

2.4. General Configuration of Core Network Node 300

Each of the core network nodes 300 (the UPFs 310, the AMF 320, the SMF 330, the NSSF 340, the UDM 350, the NEF 360, and the OPS 370) is a functional element that provides a specific network function (service) in the core network. For example, the AMF 320, which is the core network node 300, controls switching of the network slice NS to which the user apparatus 100 belongs.

Figure 4:
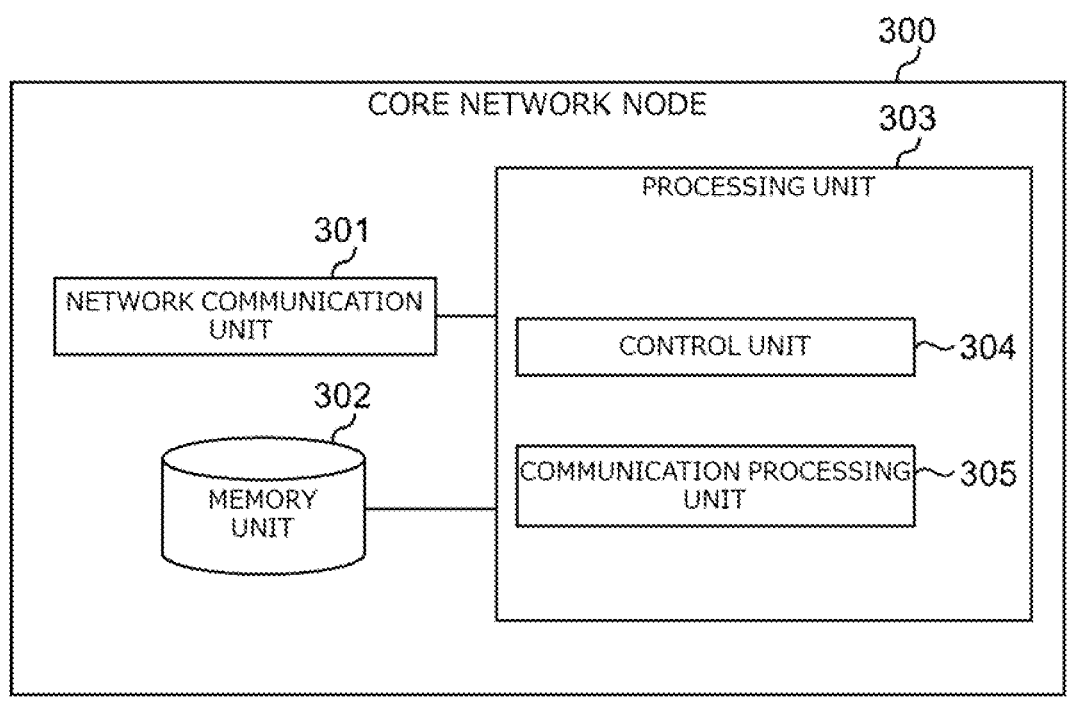
FIG. 4 is a block diagram illustrating an example of a schematic general configuration of a core network node 300 according to the first example embodiment of the present invention.

FIG. 4 is a block diagram illustrating an example of a schematic configuration of the core network node 300 according to the present example embodiment. As illustrated in FIG. 4, the core network node 300 includes a network communication unit 301, a memory unit 302, and a processing unit 303.

The network communication unit 301 is an element that communicates with other nodes inside and outside the core network. The network communication unit 301 transmits signals to the other nodes and receives signals from the other nodes. The network communication unit 301 can be implemented by resources in the core network virtualized using the NFV technology as described above.

The memory unit 302 is an element that temporarily or permanently stores programs (instructions) and pieces of data used to execute various types of processing in the core network node. The programs include one or more instructions for operation of the core network node 300. The memory unit 302 can be implemented by resources in the core network virtualized using the NFV technology as described above.

The processing unit 303 is an element that provides various functions of the core network node 300, and includes a control unit 304 and a communication processing unit 305 as functional blocks. In outline, the control unit 304 controls processing of the core network node 300, and the communication processing unit 305 performs communication processing with the other nodes. The processing unit 303 may further include components other than the above functional blocks. That is, the processing unit 303 can perform operations other than those by the above functional blocks. The processing unit 303 can be implemented by resources in the core network virtualized using the NFV technology as described above.

2.5. Configuration of Edge Server 400

The edge server 400 is a server that can communicate with the core network nodes 300 such as the UPFs 310 and provide prescribed services to the user apparatuses 100. The edge server 400 can provide services to the user apparatuses 100 more efficiently by being located at an edge site close to users.

Figure 5:
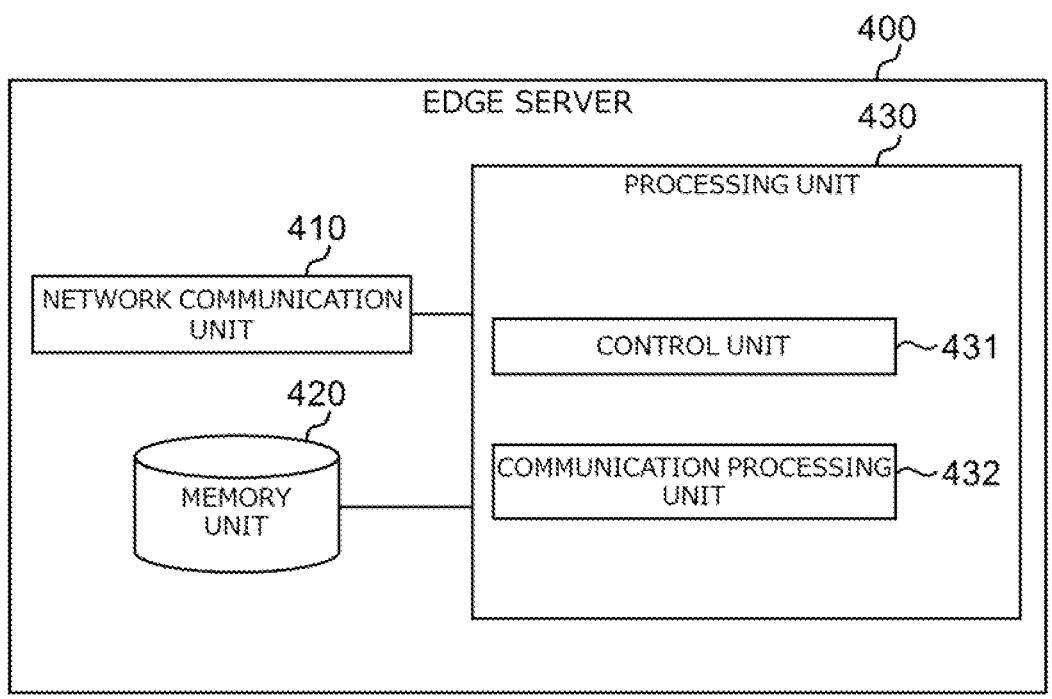
FIG. 5 is a block diagram illustrating an example of a schematic configuration of an edge server 400 according to the first example embodiment of the present invention.

FIG. 5 is a block diagram illustrating an example of a schematic configuration of the edge server 400 according to the present example embodiment. As illustrated in FIG. 5, the edge server 400 includes a network communication unit 410, a memory unit 420, and a processing unit 430.

The network communication unit 410 is an element that communicates with the core network nodes 300 (i.e., core network) such as the UPFs 310, the AMF 320, and the like. The network communication unit 410 transmits signals to the core network nodes 300 and receives signals from the core network nodes 300. The network communication unit 410 can be implemented by, for example, a network adapter and/or a network interface card.

The memory unit 420 is an element that temporarily or permanently stores programs (instructions) and pieces of data used to execute various types of processing in the edge server 400. The programs include one or more instructions for operation of the edge server 400. The memory unit 420 may be implemented by, for example, a volatile memory, a nonvolatile memory, or a storage medium such as a magnetic disk, or a combination of two or more of these. The memory unit 420 may be integrally configured with one or more processors constituting the processing unit 430.

The processing unit 430 is an element that provides various functions of the edge server 400, and includes a control unit 431 and a communication processing unit 432 as functional blocks. In outline, the control unit 431 controls processing of the edge server 400, and the communication processing unit 432 performs communication processing with other nodes such as the core network nodes 300. The processing unit 430 may further include components other than the above functional blocks. That is, the processing unit 430 can perform operations other than those by the above functional blocks.

The communication processing unit 432 can perform various types of image processing on pieces of image data transmitted from the user apparatuses 100. For example, the communication processing unit 432 can generate an image for augmented reality (AR)/virtual reality (VR)/mixed reality (MR) using image data transmitted from the plurality of user apparatuses 100. Moreover, using the image data transmitted from the plurality of user apparatuses 100, an object included in the image can be detected and tracked. The above image processing may be performed by the user apparatus 100 also having functions of the edge server 400.

The processing unit 430 may be implemented by one or more processors, for example. The processing unit 430 may perform the processing of the present example embodiment described later by deploying the programs stored in the memory unit 420 to the memory unit 420 itself and/or a system memory (not shown) and executing the programs. Each of the functional blocks (the control unit 431 and the communication processing unit 432) may be implemented by one or more processors other than the processing unit 430.

The edge server 400 (the network communication unit 410, the memory unit 420, and the processing unit 430) may be implemented by virtualized resources using the NFV technology. The edge server 400 may be configured to communicate with the base station 200 rather than the core network. That is, the edge server 400 may be configured to be capable of communicating with the core network via the base station 200.

2.6. Operation Examples

As mentioned above, conventionally, in the technical standards of the 3GPP, the change of a network slice is performed by being initiated by the core network side (AMF, etc.). On the other hand, there has been proposed a configuration in which the user apparatus initiates the change of a network slice according to a situation of the user apparatus.

In the present operation example, the user apparatus 100 initiates the network slice change for the plurality of user apparatuses 100. This operation example will be described in detail with reference to FIGS. 6 to 10. The plurality of user apparatuses 100 in the present operation example are surveillance cameras operating in cooperation with each other. Broadly speaking, the change of the network slice NS is performed by using, as a trigger, detection of an object exhibiting abnormal behavior.

Figure 6:
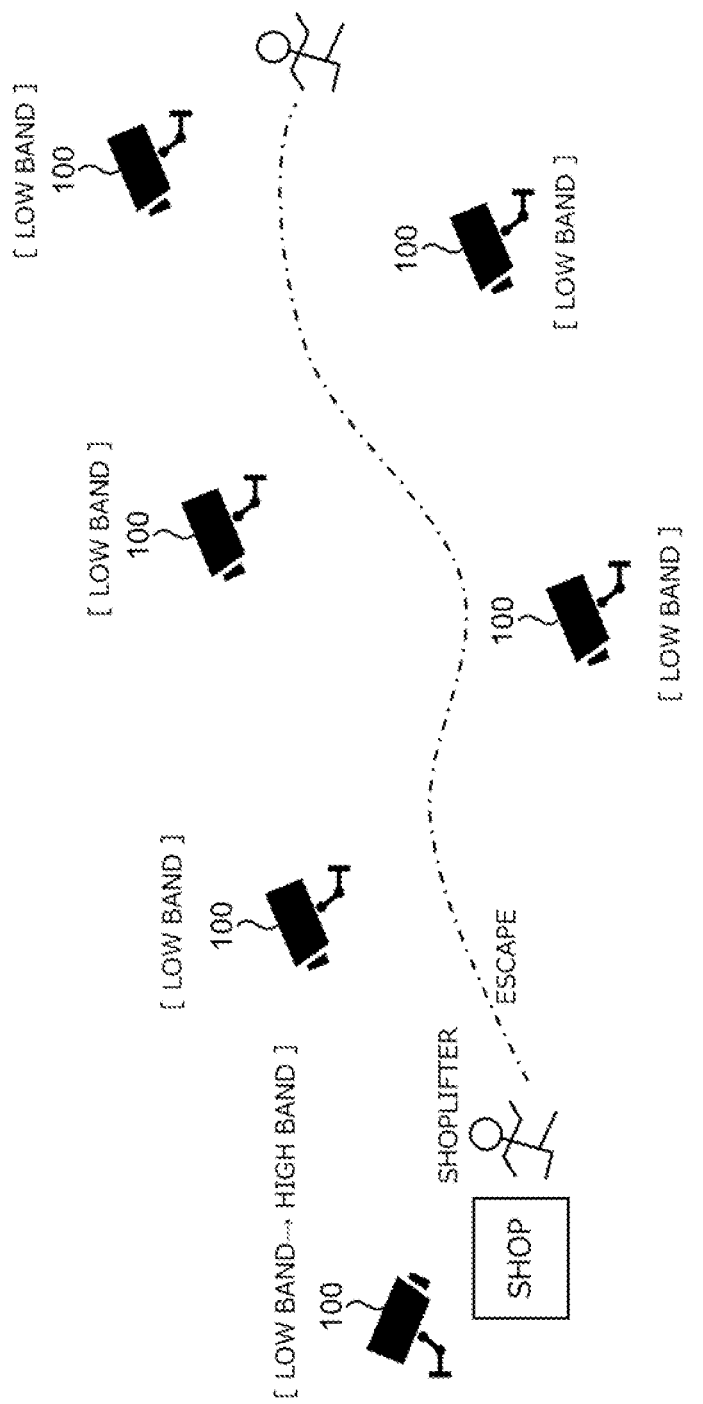
FIG. 6 is an explanatory diagram illustrating an example of a use case according to the first example embodiment of the present invention.

FIG. 6 is an explanatory diagram illustrating an example of a use case according to the first example embodiment of the present invention. It is assumed that the plurality of user apparatuses 100 (surveillance cameras) are installed in a station yard, and the plurality of user apparatuses 100 communicate using the first network slice NS1, which is a low-band slice, for bandwidth reduction. The user apparatuses 100 in this use case detect a shoplifter who has committed shoplifting (abnormal behavior) in the station yard, and track the shoplifter who runs away from a shop.

More specifically, the processing unit 130 of each user apparatus 100 transmits a captured surveillance image to the edge server 400 via the UPF 310. The communication processing unit 432 of the edge server 400 identifies the shoplifter on the surveillance images by performing face recognition or object recognition based on the surveillance images received from the respective user apparatuses 100. As described above, the detection and tracking of the shoplifter are performed based on the image processing by the edge server 400.

Since the plurality of user apparatuses 100 communicate using the first network slice NS1 which is a low-band slice, those user apparatuses 100 have difficulty providing high-definition image data necessary for the above detection and tracking in a timely manner. As a result, it is difficult (by extension, impossible) to track the shoplifter (target object) with high accuracy. Even if the user apparatus 100 that has detected the shoplifter by using the aforementioned related-art technology transitions to the second network slice NS2 which is a high-band slice, the other user apparatus 100 remains in the state using the first network slice NS1, making it difficult to track the shoplifter.

Therefore, in the present operation example, the user apparatus 100 that has detected an object exhibiting abnormal behavior causes the other user apparatus 100 to transition to the high-band slice (second network slice NS2). As a result, each user apparatus 100 can acquire high-definition image data, and the communication between the user apparatuses 100 is also performed at the high band. More specifically, the operation is as follows.

Figure 7:
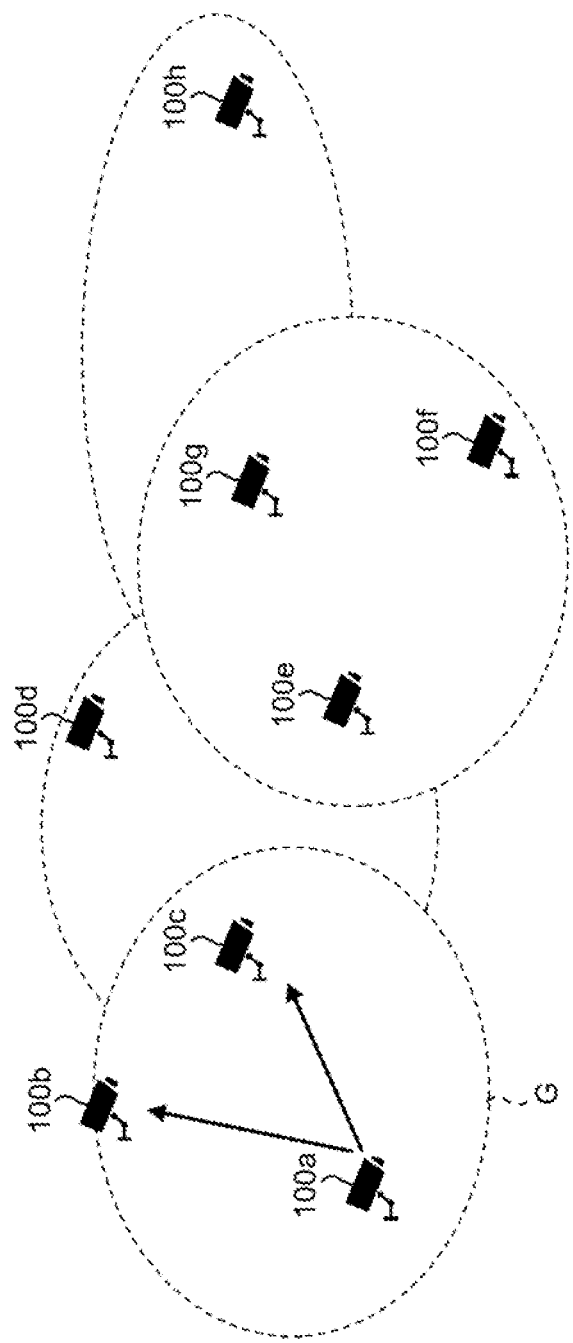
FIG. 7 is an explanatory diagram illustrating an example of a slice change list L according to the first example embodiment of the present invention.

FIG. 7 is an explanatory diagram illustrating an example of a slice change list according to the first example embodiment of the present invention. Hereafter, in order to identify the plurality of user apparatuses 100 individually, identification symbols such as a, b, c, and the like may be appended to the respective user apparatuses 100.

In the present example embodiment, a slice change group G in which a part of the plurality of user apparatuses 100 are grouped is configured. For example, as illustrated in FIG. 7, three user apparatuses 100a, 100b and 100c are set as the slice change group G for the user apparatus 100a. Each user apparatus 100 stores (holds) a slice change list L indicating the slice change group G related to the user apparatus 100 itself.

When a subject user apparatus 100 (for example, user apparatus 100a) transitions from the first network slice NS1 to the second network slice NS2, the subject user apparatus 100 (for example, user apparatus 100a) transmits change information, which indicates that transition to the second network slice is to be performed, to the other user apparatuses 100 (for example, user apparatuses 100b and 100c) that are included in the slice change list L hold by the subject user apparatus 100 itself and are other than the subject user apparatus 100. The above change information can be transmitted and received, for example, by device-to-device communication (D2D communication). The user apparatus 100 that has received the above change information transitions to the second network slice NS2 by a slice change method according to the UE-initiated trigger.

Figure 8:
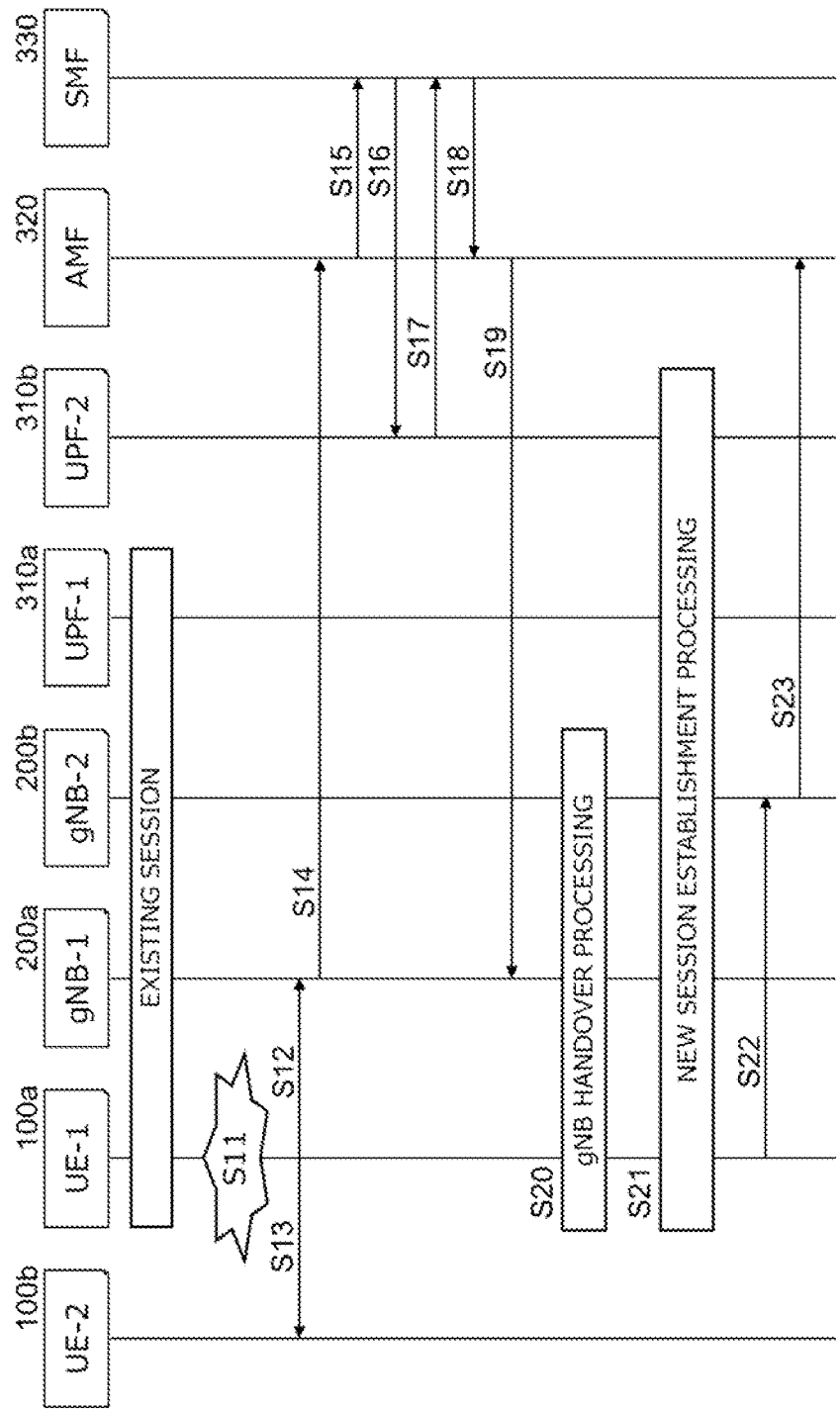
FIG. 8 is a sequence diagram illustrating an example of a slice change operation according to the first example embodiment of the present invention.

FIG. 8 is a sequence diagram illustrating an example of a slice change operation according to the first example embodiment of the present invention. In the present operation, the first user apparatus 100a and the second user apparatus 100b belong to the same slice change group G. At the start of this sequence, each of the first user apparatus 100a and the second user apparatus 100b communicates by using an existing session through a first base station 200a and a first UPF 310a.

In step S11, a communication processing unit 242a of the first user apparatus 100a detects a trigger to transition from the first network slice NS1 to the second network slice NS2. The above trigger corresponds to, for example, detection of an object (for example, an escaping shoplifter) exhibiting abnormal behavior as described above.

When the communication processing unit 242a of the first user apparatus 100a detects the above trigger, the communication processing unit 242a executes transmission processes in steps S12 and S13. That is, in step S12, the communication processing unit 242a transmits a slice switch request message requesting switching to the second network slice NS2 to the core network node 300 (AMF 320) via the first base station 200a. In addition, in step S13, the communication processing unit 242a transmits to the second user apparatus 100b change information indicating that transition to the second network slice NS2 should be performed. The processing order of steps S12 and S13 is freely selected.

The change information transmitted in step S13 is, for example, the slice change list L (first list) indicating the plurality of user apparatuses 100 included in the slice change group G to which the first user apparatus 100a and the second user apparatus 100b belong. In this configuration, the communication processing unit 242a of the first user apparatus 100a transmits the slice change list L to the user apparatuses 100 that are included in the slice change list L and are other than the first user apparatus 100a. The slice change list L (first list) is, for example, a list indicating the user apparatuses 100 capable of communicating with the first user apparatus 100a.

In step S14, the first base station 200a forwards the slice switch request message transmitted from the first user apparatus 100a to the core network node 300 (AMF 320).

In step S15, the communication processing unit 325 of the AMF 320 that has received the slice switch request message transmits to the SMF 330 an UPF change request message requesting change from a first UPF 310a to a second UPF 310b.

In step S16, the communication processing unit 335 of the SMF 330 that has received the UPF change request message transmits, to the second UPF 310b belonging to the second network slice NS2 which is the switching destination, a session establishment request message requesting establishment of a session through the second UPF 310b and the second base station 200b.

In step S17, a communication processing unit 315b of the second UPF 310b that has received the session establishment request message transmits, as a response, a session establishment response message to the SMF 330.

In step S18, the SMF 330 that has received the session establishment response message transmits, as a response, an UPF change response message to the AMF 320.

In step S19, the communication processing unit 325 of the AMF 320 that has received the UPF change response message transmits a slice switch response message and a session change request message to the first base station 200a.

In step S20, handover processing is performed to change the connection destination base station of the first user apparatus 100a from the first base station 200a to the second base station 200b.

In step S21, processing for establishing a new session through the first user apparatus 100a, the second base station 200b, and the second UPF 310b is executed.

In step S22, the first user apparatus 100a transmits a session disconnection request message for disconnecting the existing session to the core network node 300 (AMF 320) via the second base station 200b.

In step S23, the second base station 200b forwards to the core network node 300 (AMF 320) the session disconnection request message transmitted from the first user apparatus 100a. The AMF 320 that has received the session disconnection request message controls other nodes including the SMF 330 and the like to disconnect the existing session.

As a result of the above processing, the first user apparatus 100a can perform communication through the second base station 200b and the second UPF 310b that belong to the second network slice NS2. That is, the first user apparatus 100a transitions from the first network slice NS1 to the second network slice NS2.

In step S13, a communication processing unit 242b of the second user apparatus 100b that has received the change information from the first user apparatus 100a (communication processing unit 242a) transmits a slice switch request message requesting switching to the second network slice NS2 to the core network node 300 (AMF 320) via the first base station 200a, as in step S12. When the received change information is the slice change list L (first list), the communication processing unit 242b transmits the slice switch request message based on the slice change list L (first list) including the second user apparatus 100b.

In addition, as for the second user apparatus 100b, the same processes as those in steps S14 to S23 are performed, and as a result, the second user apparatus 100b can perform communication through the second base station 200b and the second UPF 310b that belong to the second network slice NS2. That is, the second user apparatus 100b transitions from the first network slice NS1 to the second network slice NS2.

Similarly to the first user apparatus 100a, the second user apparatus 100b also stores a slice change list L (second list) indicating a plurality of user apparatuses included in a slice change group to which the first and second user apparatuses belong. The above slice change list L (second list) is a list indicating user apparatuses 100 capable of communicating with the second user apparatus 100b.

As described above, the user apparatus 100a that has detected the trigger transmits the change information (for example, slice change list L) to the other user apparatus 100b, and therefore, the change of the network slice NS to which the plurality of user apparatuses 100 belong is performed.

Figure 9:
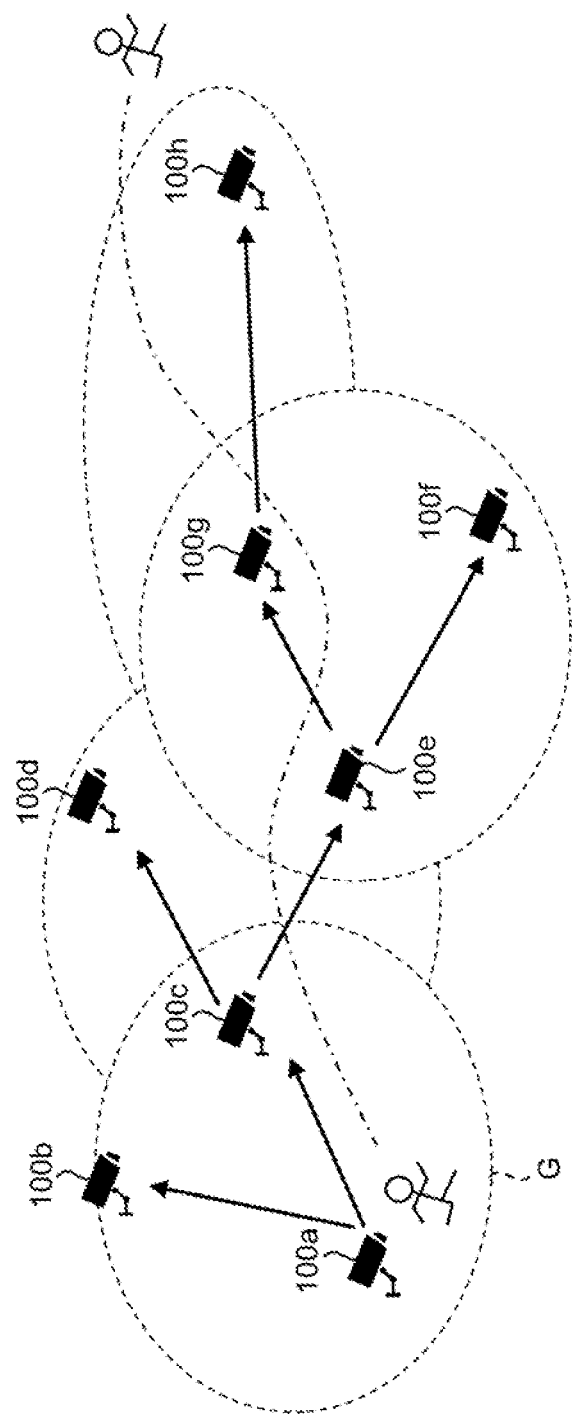
FIG. 9 is an explanatory diagram illustrating movement of a monitored object and propagation of the slice change list L in an operation example according to the first example embodiment of the present invention.

With reference to FIGS. 9 and 10, a specific example in which the operation example of the present example embodiment is applied to the use case described above will be described. FIG. 9 is an explanatory diagram illustrating the movement of a monitored object (escaping shoplifter) and the propagation of the slice change list L in the present operation example. FIG. 10 is a diagram illustrating an example of the slice change list L in the present operation example. In this example, it is assumed that all user apparatuses 100 initially belong to the first network slice NS1 with a low band. In the following description, for the sake of simplicity, it is described that each user apparatus 100 itself performs operation, but which means that the processing unit 130 (the control unit 131 and the communication processing unit 132) performs operation.

As illustrated in FIG. 10, each user apparatus 100 stores (holds) a slice change list L configured based on a positional relationship with the other user apparatuses 100. The slice change list L of a subject user apparatus 100 includes, for example, the subject user apparatus 100 itself, and other user apparatuses 100 that exist within a range in which radio waves from the subject user apparatus 100 can reach. The user apparatus 100 bracketed in slice change list L of FIG. 10 refers to the subject user apparatus itself.

An example for the user apparatus 100a is described. The slice change list L of the user apparatus 100a indicates the user apparatuses 100a, 100b and 100c. The user apparatuses 100a, 100b and 100c included in the slice change list L refer to user apparatuses 100 that should transition from the first network slice NS1 to the second network slice NS2 when the user apparatus 100a detects an abnormality. That is, the slice change list L of the user apparatus 100a indicates that the user apparatus 100a itself and the other adjacent user apparatuses 100b and 100c are transition targets.

The sequential propagation of the slice change list L is described with reference to FIG. 10. In the example of FIG. 10, it is assumed that the user apparatus 100a first has detected an abnormality. As explained with reference to FIG. 8, the user apparatus 100a transitions from the first network slice NS1 with the low band to the second network slice NS2 with the high band. In addition, the user apparatus 100a transmits the slice change list La to the user apparatuses 100b and 100c that are included in the slice change list La and are other than the user apparatus 100a itself.

The user apparatus 100b that has received the slice change list La transitions from the first network slice NS1 with the low band to the second network slice NS2 with the high band, as described above with reference to FIG. 8. The user apparatus 100b does not perform further processing because the received slice change list La includes the user apparatus 100a that is included in the own slice change list Lb and is other than the user apparatus 100b.

The user apparatus 100c that has received the slice change list La transitions from the low-band first network slice NS1 to the high-band second network slice NS2, as described above with reference to FIG. 8. In addition, the user apparatus 100c compares the received slice change list La with its own slice change list Lc, and transmits change information to the user apparatuses 100a, 100d and 100e that are not included in the slice change list La and are included only in the slice change list Lc. The above change information indicates that transition from the second network slice NS2 to the first network slice NS1 is to be performed. Here, since the user apparatuses 100d and 100e already belong to the first network slice NS1, the transition operation is not performed for those user apparatuses.

As a result of the above operation, the user apparatuses 100a, 100b and 100c transition to the second network slice NS2, and the other user apparatuses 100 remain belonging to the first network slice NS1.

Next, it is assumed that the user apparatus 100c has detected an abnormality. The user apparatus 100c does not execute the transition operation because it already belongs to the second network slice NS2 with the high band. The user apparatus 100c transmits the slice change list Lc to the user apparatuses 100a, 100d and 100e that are included in the slice change list Lc and are other than the user apparatus 100c itself.

The user apparatus 100a that has received the slice change list Lc does not perform the transition operation because it already belongs to the second network slice NS2 with the high band. The user apparatus 100a compares the received slice change list Lc with the own slice change list La. Then, the user apparatus 100a transmits change information to the user apparatus 100b that is not included in the slice change list Lc and is included only in the slice change list La. The above change information indicates that transition from the second network slice NS2 to the first network slice NS1 is to be performed. The user apparatus 100b that has received the change information transitions to the first network slice NS1.

The user apparatus 100d that has received the slice change list Lc transitions from the low-band first network slice NS1 to the high-band second network slice NS2, as described above with reference to FIG. 8. The user apparatus 100d does not perform further processing because there is no user apparatus 100 included in the own slice change list Ld and not included in the received slice change list Lc.

The user apparatus 100e that has received the slice change list Lc transitions from the low-band first network slice NS1 to the high-band second network slice NS2, as described above with reference to FIG. 8. In addition, the user apparatus 100e compares the received slice change list Lc with the own slice change list Le. Then, the user apparatus 100e transmits change information to the user apparatuses 100f and 100g which are not included in the slice change list Lc and are included only in the slice change list Le. The above change information indicates that transition from the second network slice NS2 to the first network slice NS1 is to be performed. Here, since the user apparatuses 100f and 100g already belong to the first network slice NS1, the transition operation is not performed for those user apparatuses.

As a result of the above operation, the user apparatuses 100a, 100c, 100d and 100e belong to the second network slice NS2, and the other user apparatuses 100 belong to the first network slice NS1.

According to the configuration of the present example embodiment described above, the allocation of the network slice NS can be controlled among the plurality of user apparatuses 100 in a coordinated manner. More specifically, under the initiative of the user apparatus 100 that has detected an abnormality, two or more user apparatuses 100 can transition from the first network slice NS1 with the low band to the second network slice NS2 with the high band. That is, the peripheral situation of the user apparatus 100 can be more quickly and accurately recognized by the other user apparatuses 100.

In addition, the user apparatus 100 itself transmits and receives the slice change list L directly to and from the other user apparatuses 100 to manage the slice change. As a result, the slice change can be performed with lower latency than centralized management using centralized control servers, etc.

Furthermore, when the peripheral situation of the user apparatus 100 returns to normal, the user apparatus 100 is controlled to transition from the second network slice NS2 to the first network slice NS1 based on the propagation of the slice change list L described above. As a result, the user apparatus 100 can properly transition back to the original low-band network slice NS1.

2.7. Example Alterations

The present example embodiment described above may be altered in various forms. Examples of specific aspects of alterations are illustrated below. Any of two or more aspects that are selected from the example embodiment described above and the examples illustrated below can be combined as appropriate as far as there is no inconsistency.

The communication system S1 may be a local 5G system privately built by an individual operator that is not a communication carrier. In the above configuration, the slice change lists L held by the plurality of user apparatuses 100 may be managed by the UDM 350. In addition, instead of or in addition to the UDM 350, an Authentication Server Function (AUSF) (not shown) may manage the slice change lists L. From the viewpoint of security, when the slice switch request message in the above step S12 is received from the user apparatus 100, the AUSF or the like may execute authentication processing for the user apparatus 100. With the above authentication, it is possible to prevent slice change caused by unauthorized access for the user apparatus 100 that is a surveillance camera.

In the examples of FIGS. 9 and 10, a case may occur in which the user apparatuses 100d and 100e already belong to the second network slice NS2 with the high band due to other abnormality detection events. In this case, there is a possibility that the propagation of the slice change list L based on abnormality detection by the user apparatus 100a may adversely affect the other user apparatuses 100d and 100e. To avoid the above adverse effect, i.e., erroneous transition to the low-band network slice NS1, the present example alteration adopts the following time-decay algorithm. Broadly speaking, if a certain user apparatus 100 belongs to the high-band second network slice NS2, the user apparatus 100 can return to the low-band first network slice NS1 based on the passage of time.

Each of the user apparatuses 100 stores (holds) a high-band request level variable (state variable) H. When the user apparatus 100 detects the trigger or receives the change information based on detection of the trigger from another user apparatus 100, the control unit 131 sets the high-band request level variable H to a starting value Hs (for example, a maximum value Hmax).

The control unit 131 of the user apparatus 100 attenuates the high-band request level variable H with the passage of time. For example, the control unit 131 may exponentially or linearly attenuate the high-band request level variable H. Here, a threshold Hth smaller than the starting value Hs is set in the user apparatus 100.

The control unit 131 of the user apparatus 100 controls such that the second network slice NS2 with the high band is selected while the high-band request level variable H exceeds the threshold Hth. On the other hand, the control unit 131 of the user apparatus 100 controls such that the first network slice NS1 with the low band is selected in a case in which the high-band request level variable H is below the threshold Hth.

In a case in which the user apparatus 100 detects the trigger or receives the change information based on detection of the trigger from another user apparatus 100 before the high-band request level variable H attenuates to fall below the threshold Hth, the high-band request level variable H is set to the starting value Hs (for example, the maximum value Hmax) again.

In other words, each of the user apparatuses 100 in the present example alteration stores the state variable H that is set to the starting value Hs in response to the detection of the trigger or the reception of the change information, and decreases over time. Each of the user apparatuses 100 belongs to the second network slice NS2 while the state variable H exceeds the threshold Hth, and belongs to the first network slice NS1 while the state variable H is below the threshold Hth. The above starting value Hs and/or threshold Hth are set based on a request value of the communication system S1 indicating a period of time over which the user apparatus 100 is to belong to the second network slice NS2 in the absence of the detection of the trigger or the reception of the change information. For example, each value may be set based on the ratio or difference between the starting value Hs and the threshold Hth.

According to the above configuration, even when two or more abnormality detection events occur, it is possible to avoid erroneous transition to the network slice NS1 with the low band.

3. Second Example Embodiment

Next, with reference to FIG. 11 and FIG. 13, a second example embodiment of the present invention will be described. The first example embodiment described above is a specific example embodiment, whereas the second example embodiment is a more generalized example embodiment. According to the second example embodiment described below, technical effects similar to those of the first example embodiment are exerted.

3.1. Configuration of Communication System S1x

Figure 11:
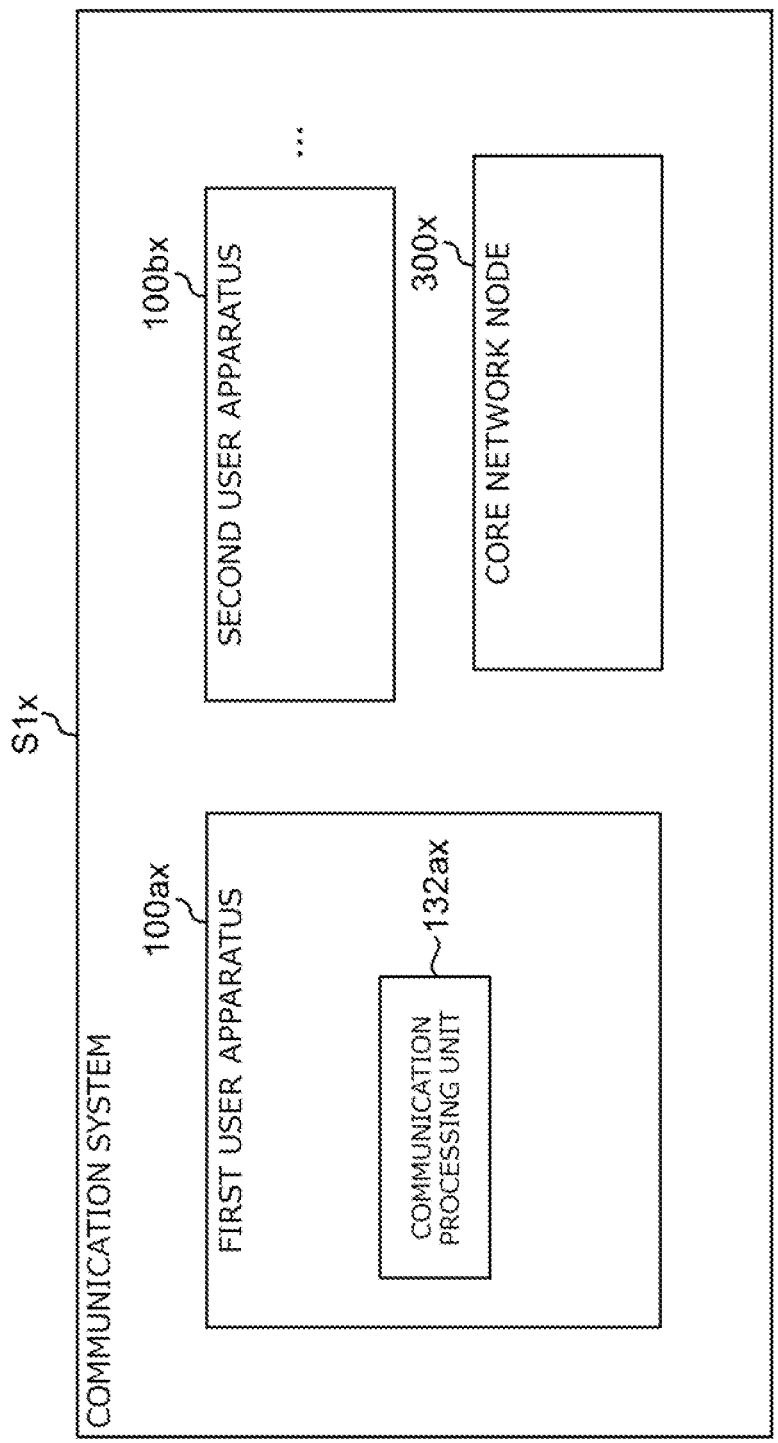
FIG. 11 is a block diagram illustrating an example of a schematic configuration of a communication system S1x according to a second example embodiment of the present invention.

FIG. 11 is a block diagram illustrating an example of a schematic configuration of a communication system S1x according to the second example embodiment of the present invention. The communication system S1x can configure a plurality of network slices. As illustrated in FIG. 11, the communication system S1x includes a plurality of user apparatuses 100x including first and second user apparatuses 100ax and 100bx belonging to a same slice change group, and one or more core network nodes 300x configured to control switching of a network slice to which the user apparatuses 100x belong.

The first user apparatus 100ax includes a communication processing unit 132ax configured to, in response to detection of a trigger to transition from a first network slice to a second network slice, transmit to the core network node 300x a switching request message requesting switching to the second network slice, and transmit to the second user apparatus 100bx change information indicating that transition to the second network slice is to be performed.

The first and second user apparatuses 100ax and 100bx may be physical devices such as surveillance cameras. The communication processing unit 132ax may be implemented by one or more processors and a memory (for example, non-volatile memory and/or volatile memory) and/or a hard disk. The memory may be included in the above one or more processors or may be located outside of the above one or more processors.

The core network node 300x may be implemented by resources of the core network virtualized using the NFV technology. Also, the core network node 300x may be implemented by a physical device such as a server device.

Relationship with First Example Embodiment

As an example, the communication processing unit 132ax included in the user apparatus 100ax according to the second example embodiment may execute the operation of the communication processing unit 132 included in the user apparatus 100 according to the first example embodiment. In the above case, description regarding the first example embodiment can also be applied to the second example embodiment. Note that the second example embodiment is not limited to the above examples.

3.2. Configuration and Operation Example of First User Apparatus 100x

Figure 12:
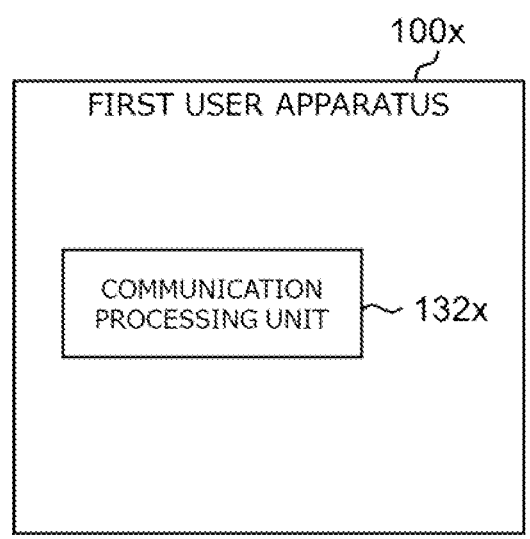
FIG. 12 is a block diagram illustrating an example of a schematic configuration of a first user apparatus 100x according to the second example embodiment of the present invention.

FIG. 12 is a block diagram illustrating an example of a schematic configuration of a first user apparatus 100x according to the second example embodiment of the present invention. In the communication system configuring the plurality of network slices, the first user apparatus 100x belongs to the same slice change group as the second user apparatus.

The first user apparatus 100x includes a communication processing unit 132x configured to, in response to detection of a trigger to transition from the first network slice to the second network slice, transmit to the core network node a switching request message requesting switching to the second network slice, and transmit to the second user apparatus change information indicating that transition to the second network slice is to be performed.

The first user apparatus 100x may be a physical device such as a surveillance camera. The communication processing unit 132x may be implemented by one or more processors and a memory (for example, non-volatile memory and/or volatile memory) and/or a hard disk. The memory may be included in the above one or more processors or may be located outside of the above one or more processors.

Relationship with First Example Embodiment

As an example, the communication processing unit 132x included in the user apparatus 100x according to the second example embodiment may execute the operation of the communication processing unit 132 included in the user apparatus 100 (for example, user apparatus 100a) according to the first example embodiment. In the above case, description regarding the first example embodiment can also be applied to the second example embodiment. Note that the second example embodiment is not limited to the above examples.

3.3. Configuration and Operation Example of Second User Apparatus 100y

Figure 13:
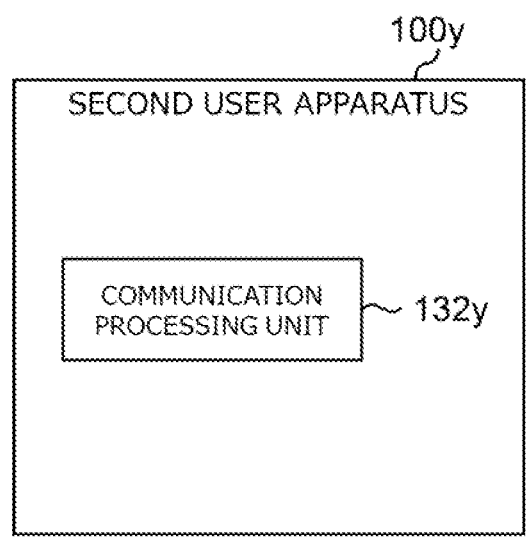
FIG. 13 is a block diagram illustrating an example of a schematic configuration of a second user apparatus 100y according to the second example embodiment of the present invention.

FIG. 13 is a block diagram illustrating an example of a schematic configuration of a second user apparatus 100y according to the second example embodiment of the present invention. In the communication system configuring the plurality of network slices, the second user apparatus 100y belongs to the same slice change group as the first user apparatus.

The second user apparatus 100y includes a communication processing unit 132y configured to receive from the first user apparatus the change information indicating that transition from the first network slice to the second network slice is to be performed.

The second user apparatus 100y may be a physical device such as a surveillance camera. The communication processing unit 132y may be implemented by one or more processors and a memory (for example, non-volatile memory and/or volatile memory) and/or a hard disk. The memory may be included in the above one or more processors or may be located outside of the above one or more processors.

Relationship with First Example Embodiment

As an example, the communication processing unit 132y included in the user apparatus 100y according to the second example embodiment may execute the operation of the communication processing unit 132 included in the user apparatus 100 (for example, user apparatus 100b) according to the first example embodiment. In the above case, description regarding the first example embodiment can also be applied to the second example embodiment. Note that the second example embodiment is not limited to the above examples.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the flowcharts. For example, the steps in the processing may be executed in order different from that described in the flowcharts or may be executed in parallel. Some of the steps in the processing may be deleted, or more steps may be added to the processing.

An apparatus including constituent elements (e.g., the control unit and/or the communication processing unit) of the user apparatus, the base station, the core network node and the edge server described in the Specification (e.g., one or more apparatuses (or units) among a plurality of apparatuses (or units) constituting any one of the entities described above, or a module for one of the plurality of apparatuses (or units)) may be provided.

Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as in the following supplementary notes, but are not limited to the following.

(Supplementary Note 1)

A communication system configuring a plurality of network slices, including:
  a plurality of user apparatuses including first and second user apparatuses belonging to a same slice change group; and
  one or more core network nodes configured to control switching of a network slice to which the user apparatus belongs,
  wherein the first user apparatus includes a communication processing unit configured to, in response to detection of a trigger to transition from a first network slice to a second network slice, transmit to the core network node a switching request message requesting switching to the second network slice, and transmit to the second user apparatus change information indicating that transition to the second network slice is to be performed.

(Supplementary Note 2)

The communication system according to Supplementary Note 1, wherein the change information is a first list indicating a plurality of user apparatuses included in the slice change group to which the first and second user apparatuses belong, and
  the communication processing unit of the first user apparatus is configured to transmit the first list to a user apparatus that is included in the first list and is other than the first user apparatus.

(Supplementary Note 3)

The communication system according to Supplementary Note 2, wherein the second user apparatus includes a communication processing unit configured to transmit to the core network node a switching request message requesting switching from the first network slice to the second network slice, based on the first list received that includes the second user apparatus.

(Supplementary Note 4)

The communication system according to Supplementary Note 3, wherein the second user apparatus is configured to store a second list indicating a plurality of user apparatuses included in the slice change group to which the first and second user apparatuses belong, and
  the communication processing unit of the second user apparatus is configured to transmit, to a user apparatus not included in the first list and included in the second list, change information indicating that transition from the second network slice to the first network slice is to be performed.

(Supplementary Note 5)

The communication system according to Supplementary Note 4, wherein the first list is a list indicating the user apparatus capable of communicating with the first user apparatus, and
  the second list is a list indicating the user apparatus capable of communicating with the second user apparatus.

(Supplementary Note 6)

The communication system according to any one of Supplementary Notes 1 to 5, wherein each of the first and second user apparatuses is configured to
  store a state variable that is set to a starting value in response to the detection of the trigger or reception of the change information, and decreases over time, and
  belong to the second network slice while the state variable exceeds a threshold, and belong to the first network slice while the state variable is below the threshold.

(Supplementary Note 7)

The communication system according to Supplementary Note 6, wherein the starting value and/or the threshold are set based on a request value indicating a period of time over which the user apparatus is to belong to the second network slice in an absence of the detection of the trigger or the reception of the change information.

(Supplementary Note 8)

The communication system according to any one of Supplementary Notes 1 to 7, wherein the user apparatus is configured to transmit and receive the change information by performing radio communication directly with an other user apparatus.

(Supplementary Note 9)

The communication system according to any one of Supplementary Notes 1 to 8, wherein a communication band for the second network slice is higher than a communication band for the first network slice.

(Supplementary Note 10)

The communication system according to any one of Supplementary Notes 1 to 9, wherein the plurality of user apparatuses are surveillance cameras, and the trigger to transition from the first network slice to the second network slice is detection of an object exhibiting abnormal behavior.

(Supplementary Note 11)

A first user apparatus in a communication system configuring a plurality of network slices, the first user apparatus belonging to a same slice change group as a second user apparatus, the first user apparatus including:

a communication processing unit configured to, in response to detection of a trigger to transition from a first network slice to a second network slice, transmit to a core network node a switching request message requesting switching to the second network slice, and transmit to the second user apparatus change information indicating that transition to the second network slice is to be performed.

(Supplementary Note 12)

The first user apparatus according to Supplementary Note 11, wherein the change information is a first list indicating a plurality of user apparatuses included in the slice change group to which the first and second user apparatuses belong, and the communication processing unit is configured to transmit the first list to a user apparatus that is included in the first list and is other than the first user apparatus.

(Supplementary Note 13)

The first user apparatus according to Supplementary Note 11 or 12, wherein the first list is a list indicating the user apparatus capable of communicating with the first user apparatus.

(Supplementary Note 14)

The first user apparatus according to any one of Supplementary Notes 11 to 13, further including a memory configured to store a state variable that is set to a starting value in response to the detection of the trigger or reception of the change information, and decreases over time, and the first user apparatus is configured to belong to the second network slice while the state variable exceeds a threshold, and belong to the first network slice while the state variable is below the threshold.

(Supplementary Note 15)

The first user apparatus according to Supplementary Note 14, wherein the starting value and/or the threshold are set based on a request value indicating a period of time over which the user apparatus is to belong to the second network slice in an absence of the detection of the trigger or the reception of the change information.

(Supplementary Note 16)

The first user apparatus according to any one of Supplementary Notes 11 to 15, wherein the first user apparatus is configured to transmit and receive the change information by performing radio communication directly with an other user apparatus.

(Supplementary Note 17)

The first user apparatus according to any one of Supplementary Notes 11 to 16, wherein a communication band for the second network slice is higher than a communication band for the first network slice.

(Supplementary Note 18)

The first user apparatus according to any one of Supplementary Notes 11 to 17, wherein the first user apparatus is a surveillance camera, and the trigger to transition from the first network slice to the second network slice is detection of an object exhibiting abnormal behavior.

(Supplementary Note 19)

A second user apparatus in a communication system configuring a plurality of network slices, the second user apparatus belonging to a same slice change group as a first user apparatus, the second user apparatus including:

a communication processing unit configured to receive from the first user apparatus change information indicating that transition from a first network slice to a second network slice is to be performed.

(Supplementary Note 20)

The second user apparatus according to Supplementary Note 19, wherein the change information is a first list indicating a plurality of user apparatuses included in the slice change group to which the first and second user apparatuses belong.

(Supplementary Note 21)

The second user apparatus according to Supplementary Note 20, wherein the communication processing unit is configured to transmit to a core network node a switching request message requesting switching from the first network slice to the second network slice, based on the first list received that includes the second user apparatus.

(Supplementary Note 22)

The second user apparatus according to Supplementary Note 21, further including a memory configured to store a second list indicating a plurality of user apparatuses included in the slice change group to which the first and second user apparatuses belong, and the communication processing unit is configured to transmit, to a user apparatus not included in the first list and included in the second list, change information indicating that transition from the second network slice to the first network slice is to be performed.

(Supplementary Note 23)

The second user apparatus according to Supplementary Note 22, wherein the first list is a list indicating the user apparatus capable of communicating with the first user apparatus, and the second list is a list indicating the user apparatus capable of communicating with the second user apparatus.

(Supplementary Note 24)

The second user apparatus according to any one of Supplementary Notes 19 to 23, wherein the memory is configured to store a state variable that is set to a starting value in response to detection of a trigger or reception of the change information, and decreases over time, and the second user apparatus is configured to belong to the second network slice while the state variable exceeds a threshold, and belong to the first network slice while the state variable is below the threshold.

(Supplementary Note 25)

The second user apparatus according to Supplementary Note 24, wherein the starting value and/or the threshold are set based on a request value indicating a period of time over which the user apparatus is to belong to the second network slice in an absence of the detection of the trigger or the reception of the change information.

(Supplementary Note 26)

The second user apparatus according to any one of Supplementary Notes 19 to 25, wherein the second user apparatus is configured to transmit and receive the change information by performing radio communication directly with an other user apparatus.

(Supplementary Note 27)

The second user apparatus according to any one of Supplementary Notes 19 to 26, wherein a communication band for the second network slice is higher than a communication band for the first network slice.

(Supplementary Note 28)

The second user apparatus according to any one of Supplementary Notes 19 to 27, wherein the second user apparatus is a surveillance camera, and
  a trigger to transition from the first network slice to the second network slice is detection of an object exhibiting abnormal behavior.

(Supplementary Note 29)
A core network node in a communication system configuring a plurality of network slices including first and second network slices, the core network node including:
  a communication processing unit configured to receive
    a switching request message that is transmitted from a first user apparatus belonging to a slice change group including a plurality of user apparatuses, and that is for requesting switching from the first network slice to the second network slice, and
    a switching request message that is transmitted from a second user apparatus belonging to the slice change group, and that is for requesting switching from the first network slice to the second network slice.

(Supplementary Note 30)
A control method in a communication system configuring a plurality of network slices, the control method including:
  in a case in which a trigger to transition from a first network slice to a second network slice is detected in a first user apparatus included in a plurality of user apparatuses belonging to a same slice change group,
  transmitting, from the first user apparatus to a core network node, a switching request message requesting switching to the second network slice, and
  transmitting, from the first user apparatus to a second user apparatus included in the slice change group, change information indicating that transition to the second network slice is to be performed.

(Supplementary Note 31)
The control method according to Supplementary Note 30, wherein the change information is a first list indicating a plurality of user apparatuses included in the slice change group to which the first and second user apparatuses belong, and
  the first list is transmitted from the first user apparatus to a user apparatus that is included in the first list and is other than the first user apparatus.

(Supplementary Note 32)
The control method according to Supplementary Note 31, wherein a switching request message requesting switching from the first network slice to the second network slice is transmitted from the second user apparatus to the core network node, based on the first list that is received by the second user apparatus and includes the second user apparatus.

(Supplementary Note 33)
The control method according to Supplementary Note 32, wherein change information indicating that transition from the second network slice to the first network slice is to be performed is transmitted from the second user apparatus to a user apparatus not included in the first list and included in a second list, and the second list indicates a plurality of user apparatuses included in the slice change group to which the first and second user apparatuses belong.

(Supplementary Note 34)
The control method according to Supplementary Note 33, wherein the first list is a list indicating the user apparatus capable of communicating with the first user apparatus, and
  the second list is a list indicating the user apparatus capable of communicating with the second user apparatus.

(Supplementary Note 35)
The control method according to any one of Supplementary Notes 30 to 34, wherein each of the first and second user apparatuses is controlled to belong to the second network slice while a state variable exceeds a threshold, and belong to the first network slice while the state variable is below the threshold, and
  the state variable is set to a starting value in response to the detection of the trigger or reception of the change information, and decreases over time.

(Supplementary Note 36)
The control method according to Supplementary Note 35, wherein the starting value and/or the threshold are set based on a request value indicating a period of time over which the user apparatus is to belong to the second network slice in an absence of the detection of the trigger or the reception of the change information.

(Supplementary Note 37)
The control method according to any one of Supplementary Notes 30 to 36, wherein the user apparatus transmits and receives the change information by performing radio communication directly with an other user apparatus.

(Supplementary Note 38)
The control method according to any one of Supplementary Notes 30 to 37, wherein a communication band for the second network slice is higher than a communication band for the first network slice.

(Supplementary Note 39)
The control method according to any one of Supplementary Notes 30 to 38, wherein the plurality of user apparatuses monitor an object,
  the trigger to transition from the first network slice to the second network slice is detection of an object exhibiting abnormal behavior.

(Supplementary Note 40)
A program causing a computer to function as a first user apparatus including a communication processing unit configured to, in response to detection of a trigger to transition from a first network slice to a second network slice, transmit to a core network node a switching request message requesting switching to the second network slice, and transmit to a second user apparatus change information indicating that transition to the second network slice is to be performed.

(Supplementary Note 41)
A non-transitory recording medium having stored therein a program causing a computer to function as a first user apparatus including a communication processing unit configured to, in response to detection of a trigger to transition from a first network slice to a second network slice, transmit to a core network node a switching request message requesting switching to the second network slice, and transmit to a second user apparatus change information indicating that transition to the second network slice is to be performed.

This application claims priority based on JP 2020-130844 filed on Jul. 31, 2020, the entire disclosure of which is incorporated herein.

INDUSTRIAL APPLICABILITY

The allocation of the network slice NS can be controlled in a coordinated manner among the plurality of user apparatuses 100. More specifically, under the initiative of the user apparatus 100 that detects the abnormality, the plurality of user apparatuses 100 can transition from the first network slice NS1 of the low band to the second network slice NS2 of the high band. That is, the respective peripheral situations of the user apparatuses 100 can be more quickly and accurately grasped by the other user apparatuses 100.

REFERENCE SIGNS LIST

100 User Apparatus
200 Base Station
300 Core Network Node
400 Edge Server
NS Network Slice
S1 Communication System

What is claimed is:

1. A communication system configuring a plurality of network slices, comprising:
a plurality of user apparatuses including first and second user apparatuses belonging to a same slice change group; and
one or more core network nodes configured to control switching of a network slice to which the user apparatus belongs,
wherein the first user apparatus is configured to, in response to detection of a trigger to transition from a first network slice to a second network slice, transmit to the core network node a switching request message requesting switching to the second network slice, and transmit to the second user apparatus change information indicating that transition to the second network slice is to be performed.

2. The communication system according to claim 1, wherein the change information is a first list indicating a plurality of user apparatuses included in the slice change group to which the first and second user apparatuses belong, and
the first user apparatus is configured to transmit the first list to a user apparatus that is included in the first list and is other than the first user apparatus.

3. The communication system according to claim 2, wherein the second user apparatus is configured to transmit to the core network node a switching request message requesting switching from the first network slice to the second network slice, based on the first list received that includes the second user apparatus.

4. The communication system according to claim 3, wherein the second user apparatus is configured to store a second list indicating a plurality of user apparatuses included in the slice change group to which the first and second user apparatuses belong, and
the second user apparatus is configured to transmit, to a user apparatus not included in the first list and included in the second list, change information indicating that transition from the second network slice to the first network slice is to be performed.

5. The communication system according to claim 4, wherein the first list is a list indicating the user apparatus capable of communicating with the first user apparatus, and
the second list is a list indicating the user apparatus capable of communicating with the second user apparatus.

6. The communication system according to claim 1, wherein each of the first and second user apparatuses is configured to
store a state variable that is set to a starting value in response to the detection of the trigger or reception of the change information, and decreases over time, and
belong to the second network slice while the state variable exceeds a threshold, and belong to the first network slice while the state variable is below the threshold.

7. The communication system according to claim 6, wherein the starting value and/or the threshold are set based on a request value indicating a period of time over which the user apparatus is to belong to the second network slice in an absence of the detection of the trigger or the reception of the change information.

8. The communication system according to claim 1, wherein the user apparatus is configured to transmit and receive the change information by performing radio communication directly with another user apparatus.

9. The communication system according to claim 1, wherein a communication band for the second network slice is higher than a communication band for the first network slice.

10. The communication system according to claim 1, wherein the plurality of user apparatuses are surveillance cameras, and
the trigger to transition from the first network slice to the second network slice is detection of an object exhibiting abnormal behavior.

11. A first user apparatus in a communication system configuring a plurality of network slices, the first user apparatus belonging to a same slice change group as a second user apparatus, the first user apparatus comprising:
one or more memories configured to store an instruction; and
one or more processors configured to execute the instruction to:
in response to detection of a trigger to transition from a first network slice to a second network slice, transmit to a core network node a switching request message requesting switching to the second network slice, and
transmit to the second user apparatus change information indicating that transition to the second network slice is to be performed.

12. The first user apparatus according to claim 11, wherein the change information is a first list indicating a plurality of user apparatuses included in the slice change group to which the first and second user apparatuses belong, and
the one or more processors are configured to transmit the first list to a user apparatus that is included in the first list and is other than the first user apparatus.

13. The first user apparatus according to claim 11, wherein the first list is a list indicating the user apparatus capable of communicating with the first user apparatus.

14. The first user apparatus according to claim 11, further comprising a memory configured to store a state variable that is set to a starting value in response to the detection of the trigger or reception of the change information, and decreases over time, and
the first user apparatus is configured to belong to the second network slice while the state variable exceeds a threshold, and belong to the first network slice while the state variable is below the threshold.

15. The first user apparatus according to claim 14, wherein the starting value and/or the threshold are set based on a request value indicating a period of time over which the user apparatus is to belong to the second network slice in an absence of the detection of the trigger or the reception of the change information.

16. The first user apparatus according to claim 11, wherein the first user apparatus is configured to transmit and receive the change information by performing radio communication directly with another user apparatus.

17. The first user apparatus according to claim 11, wherein a communication band for the second network slice is higher than a communication band for the first network slice.

18. The first user apparatus according to claim 11, wherein the first user apparatus is a surveillance camera, and
the trigger to transition from the first network slice to the second network slice is detection of an object exhibiting abnormal behavior.

19. A second user apparatus in a communication system configuring a plurality of network slices, the second user apparatus belonging to a same slice change group as a first user apparatus, the second user apparatus comprising:
one or more memories configured to store an instruction; and
one or more processors configured to execute the instruction to
receive from the first user apparatus change information indicating that transition from a first network slice to a second network slice is to be performed.

20. The second user apparatus according to claim 19, wherein the change information is a first list indicating a plurality of user apparatuses included in the slice change group to which the first and second user apparatuses belong.

\* \* \* \* \*